US007453795B1

(12) United States Patent
Pan et al.

(10) Patent No.: US 7,453,795 B1
(45) Date of Patent: Nov. 18, 2008

(54) FAULT RECOVERY FOR COMMUNICATION NETWORKS

(75) Inventors: James J. Pan, Foster City, CA (US); Boris Rabinovich, San Francisco, CA (US); James D. Black, San Francisco, CA (US); Renxiang Huang, Sunnyvale, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 727 days.

(21) Appl. No.: 10/960,591

(22) Filed: Oct. 7, 2004

(51) Int. Cl.
*H04J 3/14* (2006.01)

(52) U.S. Cl. ...................... 370/216; 370/252

(58) Field of Classification Search .............. 370/216, 370/217, 221, 223, 225, 227, 228, 252, 253
See application file for complete search history.

(56) References Cited

U.S. PATENT DOCUMENTS

| 6,324,162 | B1 * | 11/2001 | Chaudhuri | 370/225 |
| 2002/0131362 | A1 * | 9/2002 | Callon | 370/216 |
| 2002/0167898 | A1 * | 11/2002 | Thang et al. | 370/216 |
| 2005/0135231 | A1 * | 6/2005 | Bellovin | 370/216 |

OTHER PUBLICATIONS

Wang, Jian; Sahasrabuddhe, Laxman; Mukherjee, Biswanath, "Path vs. Subpath vs. Link Restoration for Fault Management in IP-over-WDM Networks: Performance Comparisons Using GMPLS Control Signaling," Topics in Lightwave, IEEE Communications Magazine, Nov. 2002, pp. 80-87.

Li, Guangzhi; Yates, Jennifer; Doverspike, Robert; and Wang, Dongmei, "Experiments in Fast Restoration using GMPLS in Optical/Electronic Mesh Networks," 2001 OFC.

Bartos, Radim; Bhatia, Swapnil, "Fast Restoration Signaling in Optical Networks," Proc. of the Special Session on Optical Networks and Communications of the Fourteenth IASTED International Conference on Parallel and Distributed Computing and Systems (PDCS), Cambridge, MA, pp. 845-850, Nov. 2002.

Newson, Vick, "DWS Competitive Analysis" Justification of OXC (1), Product Management Jun. 4, 2003.

Zang, Hui; MacDonald, Robert A.; and Pan, James, "Sprint Core Network Study-Part II: Wavelength Converter Placement in WDM Mesh Networks with Shared Protection Schemes," Core Network Study-Part II Jan. 2002.

* cited by examiner

*Primary Examiner*—Ricky Ngo
*Assistant Examiner*—Kan Yuen

(57) ABSTRACT

A control system for a communication network stores a plurality of fault recovery plans that are respectively associated with a plurality of links. The control system processes a first control signal from the communication network indicating that one of the links has a fault, and in response, identifies one of the fault recovery plans that is associated with the one link having the fault and implements the one fault recovery plan. The control system receives a second control signal from the communication network indicating network information, and in response, recalculates the fault recovery plans. The recalculated fault recovery plans implement link-based fault recovery, sub-path based fault recovery, and path-based fault recovery. The recalculated fault recovery plans group links constituents into groups by QoS requirements and assign the groups to back-up routes based on the QoS requirements and the performance of the back-up routes.

9 Claims, 9 Drawing Sheets

FAULT RECOVERY FOR COMMUNICATION NETWORKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to fault recovery for communication networks comprised of switch nodes that establish communication paths.

2. Description of the Prior Art

FIG. 1 illustrates communication network 100 in an example of the prior art. Communication network 100 includes switch nodes 111-135. Within communication network 100, switch nodes 111-135 are coupled together by network links 301-340. Access to communication network 100 is provided by access links 201-210 that are coupled to respective switch nodes 111-115 and 131-135. Most of the switch nodes will typically have access links, but the number of access links depicted on FIG. 1 is restricted for the clarity.

Switch nodes 111-135 could be optical cross-connect systems. Links 201-210 and 301-340 could be optical fibers or light waves carrying SONET/SDH signals. Switch nodes 111-135 could communicate over links 201-210 and 301-340 using Wave Division Multiplexing (WDM) systems and the Synchronous Optical Network (SONET) protocol. The SONET protocol may carry other protocols, such as Multi-Protocol Label Switching (MPLS), Asynchronous Transfer Mode (ATM), Internet Protocol (IP), Frame Relay (FR), Time Division Multiplex (TDM), or the like.

Communication network 100 also includes network control system 105. Network control system 105 exchanges control signals 106 with switch nodes 111-135. This exchange of control signals 106 could occur through intermediate systems that are not shown for clarity. Typically, the control signals 106 that are transferred from switch nodes 111-135 to network control system 105 include network information. The network information may include network topology, performance, and alarm information. The performance information may indicate or be used to determine: network efficiency, network availability, restoration success rate, restoration time, latency, jitter, and the like. The alarm information may indicate or be used to determine faults and other network problems.

Typically, the control signals 106 that are transferred from network control system 105 to switch nodes 111-135 include switching information. The switching information typically directs switch nodes 111-135 to change where they route incoming SONET signals. For example, switch node 122 may indicate to network control system 105 that link 312 has a fault, and in response, network control system 105 may direct switch node 122 to re-route SONET signals off of link 312 and onto links 307, 311, and/or 316.

In operation, communication system 100 establishes communication paths that are comprised of various links. A link extends between two adjacent switch nodes, and a communication path extends between two or more access links. For example, communication network 100 could establish a communication path from access link 202 to access link 207 through links 310-313 and switch nodes 112, 117, 122, 127, and 132.

Link-Based Fault Recovery

FIG. 2 illustrates link-based protection for communication network 100 in an example of the prior art. For clarity, many components of communication network 100 that were shown on FIG. 1 are not shown on FIG. 2. Communication network 100 has established a communication path from access link 202 to access link 207 through links 310-313 and switch nodes 112, 117, 122, 127, and 132. The communication path could be a SONET OC-48 signal that contains 48 constituent STS-1 signals. The STS-1 signals may carry protocols such as MPLS, ATM, IP, FR, TDM or the like.

Consider that a fault occurs on link 312 (indicated by the "X" mark). Switch node 122 and/or switch node 127 detect the fault and transfer control signals 106 indicating the fault to network control system 105.

Network control system 105 is configured to provide link-based protection over pre-determined back-up communication routes. With link-based protection, bandwidth over pre-determined back-up routes is reserved to protect each link. Note that for link-based protection, the back-up routes extend from one of the endpoints of link 312 to the other. The endpoints for link 312 are switch nodes 122 and 127.

In this example, link 312 is protected by three back-up communication routes that extend between link-endpoint switch nodes 122 and 127. A first back-up route uses switch nodes 121 and 126, and links 307, 303, and 308 to transfer five of the constituent STS-1 signals between switch nodes 122 and 127. A second back-up route uses switch nodes 123 and 128, and links 316, 321, and 317 to transfer ten of the constituent STS-1 signals between switch nodes 122 and 127. A third back-up route uses switch nodes 123, 124, 129, and 128 and links 316, 325, 330, 326, and 317 to transfer 33 of the constituent STS-1 signals between switch nodes 122 and 127. Thus, all 48 constituent STS-1 signals can be transferred between switch nodes 122 and 127 over the back-up routes in the link-based protective scheme.

In response to the alarm information indicating the fault on link 312, network control system 105 transfers switching information to switch nodes 121-129 to implement the reserved bandwidth over the three pre-determined back-up routes. In response to the switching information, switch nodes 121-129 implement the three back-up routes as described above. After implementation of the back-up routes, the communication path from access link 202 to access link 207 is again operational.

Alternatively, network control system 105 could be configured to provide link-based restoration instead of link-based protection. With restoration instead of protection, the bandwidth is not reserved before the fault, and network control system 105 must determine if the needed bandwidth is available on the back-up routes after the fault. Network control system 105 could determine that the needed bandwidth is available on the three back-up routes (even though the bandwidth was not reserved), and once this determination is made, the link-based restoration would be implemented in a similar fashion to the link-based protection example described above.

Alternatively, network control system 105 could be configured to provide dynamic link-based protection/restoration as opposed to pre-determined link-based protection/restoration. With dynamic restoration/protection, the back-up routes are not pre-determined before the fault, and network control system 105 must determine the back-up routes after the fault. After the fault, network control system 105 could dynamically select the three back-up routes that are described above, and once this determination is made, the dynamic link-based protection or restoration would be implemented in a similar fashion to the link-based protection example described above.

Path-Based Fault Recovery

FIG. 3 illustrates path-based protection for communication network 100 in an example of the prior art. For clarity, many components of communication network 100 that were shown on FIG. 1 are not shown on FIG. 3. Communication network 100 has established a communication path from access link 202 to access link 207 through links 310-313 and switch nodes 112, 117, 122, 127, and 132. The communication path could be a SONET OC-48 signal that contains 48 constituent STS-1 signals.

Consider that a fault occurs on link 312 (indicated by the "X" mark). Switch node 122 and/or switch node 127 detect the fault and transfer control signals 106 indicating the fault to network control system 105.

Network control system 105 is configured to provide path-based protection over pre-determined back-up communication routes. With path-based protection, bandwidth over pre-determined back-up routes is reserved to protect each communication path. Note that for path-based protection, the back-up routes extend from one of the endpoints of the communication path to the other. The endpoints for the communication path are switch nodes 112 and 132.

In this example, the communication path is protected by three back-up communication routes that extend between path-endpoint switch nodes 112 and 132. A first back-up route uses switch nodes 111, 116, 121, 126, and 131 and links 305, 301, 302, 303, 304, and 309 to transfer five of the constituent STS-1 signals between switch nodes 112 and 132. A second back-up route uses switch nodes 113, 114, 119, 124, 129, 128, and 127 and links 314, 323, 328, 329, 330, 326, 317, and 313 to transfer ten of the constituent STS-1 signals between switch nodes 112 and 132. A third back-up route uses switch nodes 113, 118, 123, 128, and 133 and links 314, 319, 320, 321, 322, and 318 to transfer 33 of the constituent STS-1 signals between switch nodes 112 and 132. Thus, all 48 constituent STS-1 signals can be transferred between switch nodes 112 and 132 over the back-up routes.

In response to the alarm information indicating the fault on link 312, network control system 105 transfers switching information to switch nodes 111-114, 116-119, 121-124, 126-129, and 131-133 to implement the reserved bandwidth over the three pre-determined back-up routes. In response to the switching information, switch nodes 111-114, 116-119, 121-124, 126-129, and 131-133 implement the three back-up routes as described above. After implementation of the back-up routes, the communication path from access link 202 to access link 207 is again operational.

Alternatively, network control system 105 could be configured to provide path-based restoration instead of path-based protection. With restoration instead of protection, the bandwidth is not reserved before the fault, and network control system 105 must determine if the needed bandwidth is available on the back-up routes after the fault. Network control system 105 could determine that the needed bandwidth is available on the three back-up routes (even though the bandwidth was not reserved), and once this determination is made, the path-based restoration would be implemented in a similar fashion to the path-based protection example described above.

Alternatively, network control system 105 could be configured to provide dynamic path-based protection/restoration as opposed to pre-determined path-based protection/restoration. With dynamic restoration/protection, the back-up routes are not pre-determined before the fault, and network control system 105 must determine the back-up routes after the fault. After the fault, network control system 105 could dynamically select the three back-up routes that are described above, and once this determination is made, the dynamic path-based protection/restoration would be implemented in a similar fashion to the path-based protection example described above.

Sub-Path-Based Fault Recovery

FIG. 4 illustrates sub-path-based protection for communication network 100 in an example of the prior art. For clarity, many components of communication network 100 that were shown on FIG. 1 are not shown on FIG. 4. Communication network 100 has established a communication path from access link 202 to access link 207 through links 310-313 and switch nodes 112, 117, 122, 127, and 132. The communication path could be a SONET OC-48 signal that contains 48 constituent STS-1 signals.

Consider that a fault occurs on link 312 (indicated by the "X" mark). Switch node 122 and/or switch node 127 detect the fault and transfer control signals 106 indicating the fault to network control system 105.

Network control system 105 is configured to provide sub-path-based protection over pre-determined back-up communication routes. With sub-path-based protection, bandwidth over predetermined back-up routes is reserved to protect sub-paths of a given communication path. Note that for sub-path-based protection, the back-up routes do not extend between the link endpoints (nodes 122 and 127), and the back-up routes do not extend between the path endpoints (nodes 112 and 132). Instead, the back-up routes extend from at least one switch node that is not a path endpoint or a link endpoint.

In this example, a sub-path formed by links 311-312 is protected by a back-up communication route that extends between switch nodes 117 and 127. The back-up route uses switch nodes 118, 119, 124, 129, and 128 and links 315, 324, 329, 330, 326, and 317 to transfer all 48 of the constituent STS-1 signals between switch nodes 117 and 127.

In response to the alarm information indicating the fault on link 312, network control system 105 transfers switching information to switch nodes 117-119, 122, 124, and 127-129 to implement the reserved bandwidth over the pre-determined back-up route. In response to the switching information, switch nodes 117-119, 122, 124, and 127-129 implement the back-up route as described above. After implementation of the back-up route, the communication path from access link 202 to access link 207 is again operational.

Alternatively, network control system 105 could be configured to provide sub-path-based restoration instead of sub-path-based protection. With restoration instead of protection, the bandwidth is not reserved before the fault, and network control system 105 must determine if the needed bandwidth is available on the back-up route after the fault. Network control system 105 could determine that the needed bandwidth is available on the back-up route (even though the bandwidth was not reserved), and once this determination is made, the sub-path-based restoration would be implemented in a similar fashion to the sub-path-based protection example described above.

Alternatively, network control system 105 could be configured to provide dynamic sub-path-based protection/restoration as opposed to pre-determined sub-path-based protection/restoration. With dynamic restoration/protection, the back-up route is not pre-determined before the fault, and network control system 105 must determine the back-up route after the fault. After the fault, network control system 105 could dynamically select the back-up route that is described above, and once this determination is made, the dynamic sub-path-based protection/restoration would be implemented in a similar fashion to the sub-path-based protection example described above.

Problems

For illustrative purposes, communication network 100 has been used above to demonstrate various multiple fault-recovery techniques (link, path, or sub-path). In practice, communication network 100 would only implement a single one of these fault-recovery schemes. As such, communication network 100 would not effectively benefit from the capability offered in a hybrid mix of link, path, and sub-path fault-recovery techniques. In addition, communication network 100 does not process network information to adaptively modify coordination among link, path, and sub-path fault-recovery schemes.

Communication network 100 carries numerous protocols that correspond to multiple different service offerings. For example, one of the STS-1 link constituents in the above examples could transfer digital voice information between telecommunication platforms, while another one of the STS-1 constituents could transfer IP packets between Internet routers. Due to the diverse services supported by the different link constituents, the link constituents have differing Quality-of-Service (QoS) requirements. For example, the amount of time that is allowed to recover from a fault may be much lower for the voice traffic than for the IP traffic. Unfortunately, communication network 100 cannot effectively benefit from an adaptive mix of fault-recovery techniques that are capable of meeting the QoS requirements of the link constituents on the communication path.

SUMMARY OF THE INVENTION

Examples of the invention include control systems for communication networks, control system methods of operation, and control system software.

Some examples of the invention include a method of operating a control system for a communication network, wherein the control system stores a plurality of fault recovery plans that are respectively associated with a plurality of links. The method comprises: receiving a first control signal from the communication network indicating that one of the links has a fault, and in response, identifying one of the fault recovery plans that is associated with the one link having the fault and implementing the one fault recovery plan; and receiving a second control signal from the communication network indicating network information, and in response, recalculating the fault recovery plans, wherein the recalculated fault recovery plans implement link-based fault recovery, sub-path based fault recovery, and path-based fault recovery.

Some examples of the invention include a method of operating a control system to calculate a fault recovery plan for a link in a communication network. The method comprises: grouping link constituents for the link into constituent groups based on Quality-of-Service (QoS) requirements for each of the link constituents, determining link back-up routes that are disjoint from the link, determining performance characteristics for the link back-up routes, and assigning at least a first portion of the constituent groups to at least a portion of the link back-up routes based on the QoS requirements of the first portion of the constituent groups and the performance characteristics the link back-up routes. If any of the constituent groups are unassigned to the link back-up routes, then the method further comprises determining sub-paths for the link, determining sub-path back-up routes that are disjointed from the sub-paths, determining performance characteristics for the sub-path back-up routes, and assigning at least a second portion of the constituent groups to at least a portion of the sub-path back-up routes based on the QoS requirements of the second portion of the of the constituent groups and the performance characteristics for the sub-path back-up routes. If any of the constituent groups are unassigned to either the link back-up routes or the sub-path back-up routes, then the method further comprises determining paths for the link, determining path back-up routes that are disjointed from the paths, determining performance characteristics for the path back-up routes, and assigning at least a third portion of the constituent groups to at least a portion of the path back-up routes based on the QoS requirements of the third portion of the constituent groups and the performance characteristics for the path back-up routes.

BRIEF DESCRIPTION OF THE DRAWINGS

The same reference number represents the same element on all drawings.

DETAILED DESCRIPTION OF THE PREFERRED EMBODIMENT

FIGS. 5-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Communication System

Figure 1:
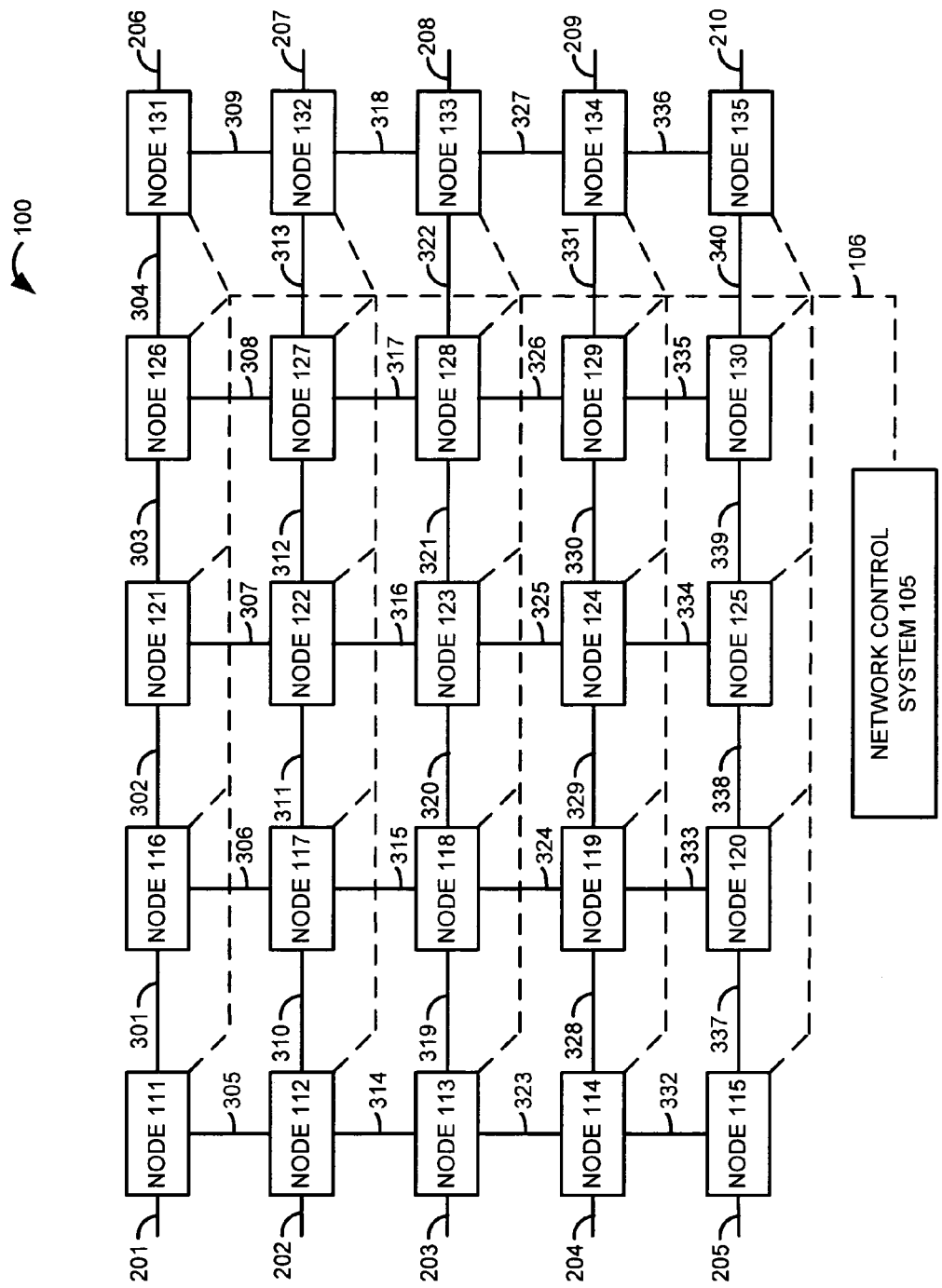
FIG. 1 illustrates a communication network in an example of the prior art.
Figure 2:
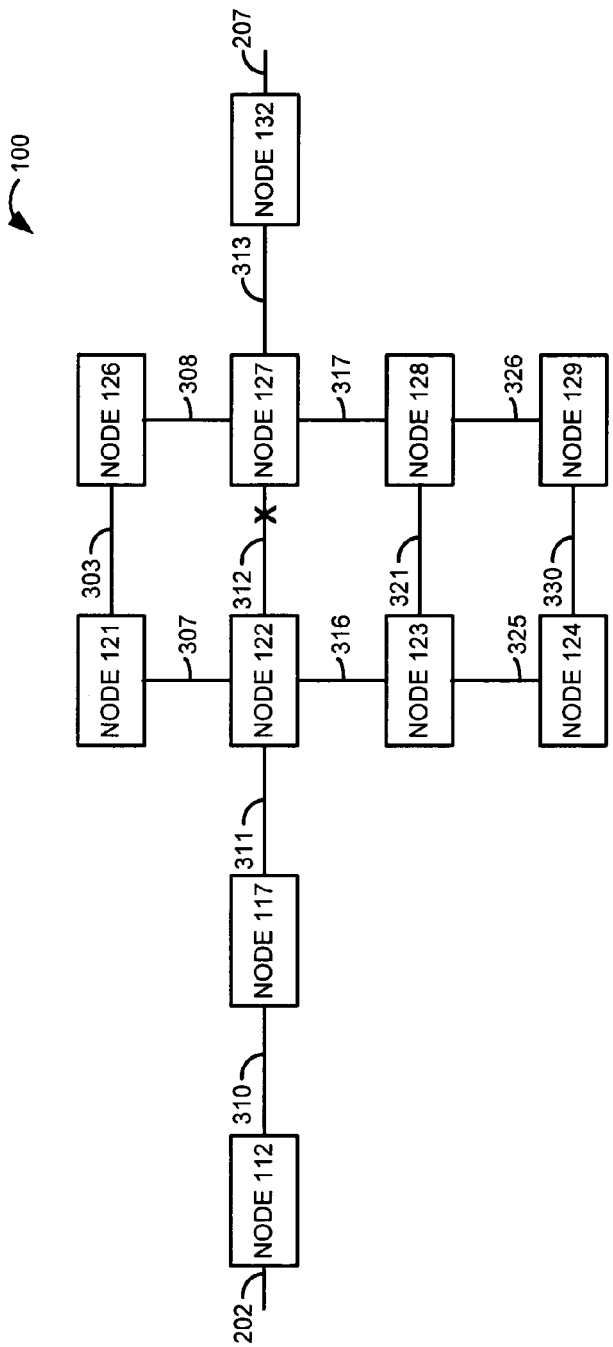
FIG. 2 illustrates link-based fault recovery in an example of the prior art.
Figure 3:
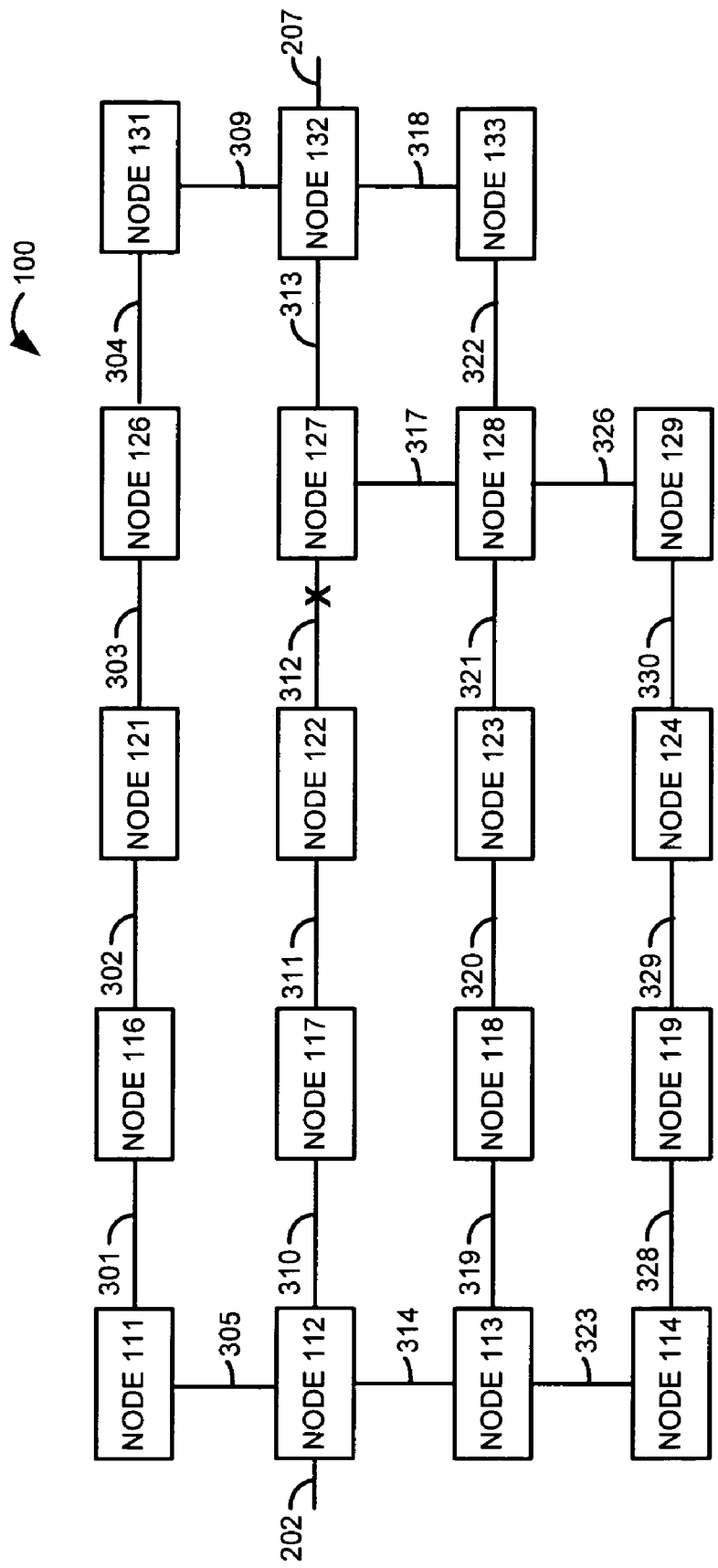
FIG. 3 illustrates path-based fault recovery in an example of the prior art.
Figure 4:
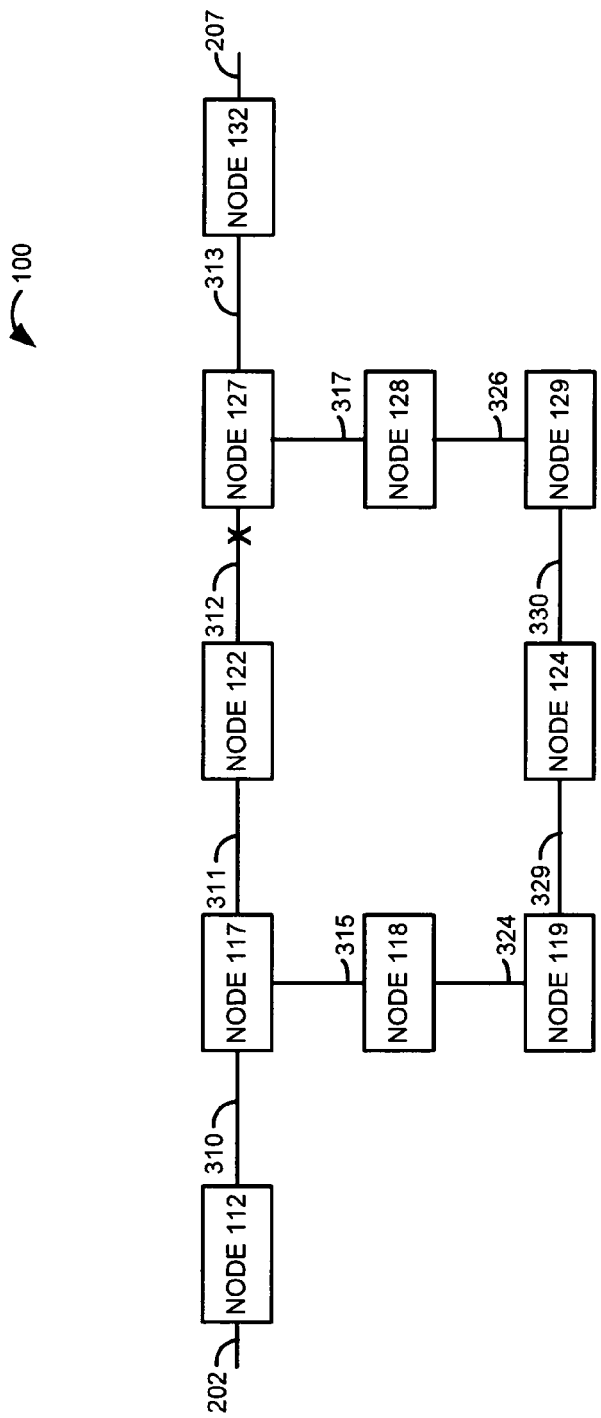
FIG. 4 illustrates sub-path-based fault recovery in an example of the prior art.
Figure 5:
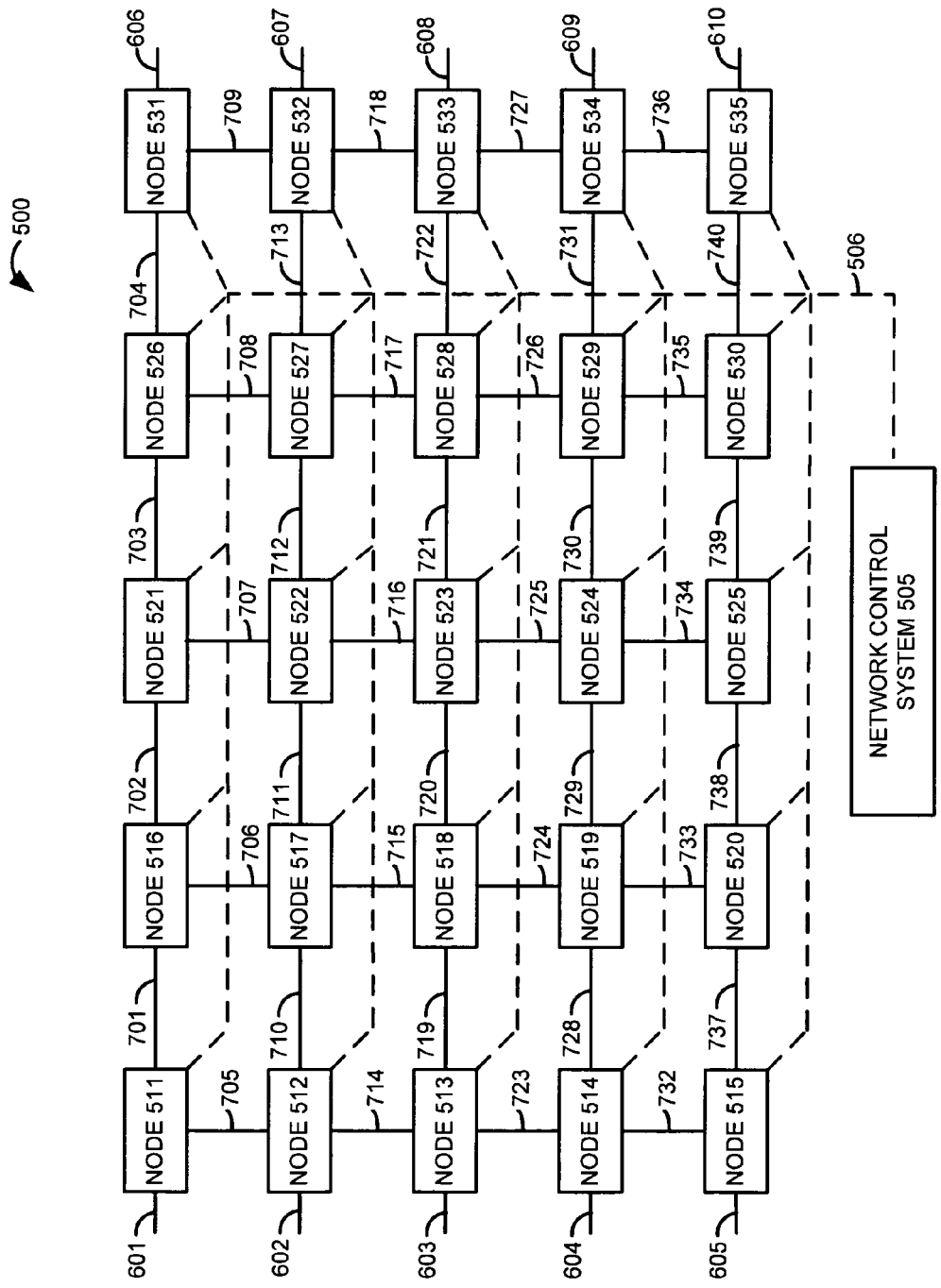
FIG. 5 illustrates a communication network in an example of the invention.

FIG. 5 illustrates communication system 500 in an example of the invention. Communication system 500 includes switch nodes 511-535. Within communication network 500, switch nodes 511-535 are coupled together by network links 701-740. Access to communication network 500 is provided by access links 601-610 that are coupled to respective switch nodes 511-515 and 531-535. Most of the switch nodes will typically have access links, but the number of access links depicted on FIG. 5 is restricted for the clarity.

Switch nodes 511-535 could be optical cross-connect systems. Links 601-610 and 701-740 could be optical fibers. Switch nodes 511-535 could communicate over links 601-610 and 701-740 using Wave Division Multiplexing (WDM) systems and the Synchronous Optical Network (SONET) protocol. The SONET protocol may carry other protocols, such as Multi-Protocol Label Switching (MPLS), Asynchronous Transfer Mode (ATM), Internet Protocol (IP), Frame Relay (FR), Time Division Multiplex (TDM), or the like.

Communication network 500 also includes network control system 505. Network control system 505 exchanges control signals 506 with switch nodes 701-740. This exchange of control signals 506 could occur through intermediate systems that are not shown for clarity. Typically, the control signals 506 that are transferred from switch nodes 511-535 to network control system 505 include network information. The network information may include network topology, performance, and alarm information. The performance information may indicate or be used to determine: network efficiency, network availability, fault recovery success rate, fault recovery time, latency, jitter, and the like. The alarm information may indicate or be used to determine faults and other network problems.

The control signals 506 that are transferred from network control system 505 to switch nodes 511-535 may include switching information. The switching information directs switch nodes 511-535 to change where they route incoming signals. For example, switch node 522 may indicate to network control system 505 that link 712 has a fault, and in response, network control system 505 may direct switch node 522 to re-route signals off of link 712 and onto links 707, 711, and/or 716.

In operation, communication system 500 establishes communication paths that are comprised of various links. In the context of the invention, a link extends between two adjacent switch nodes, and a communication path extends between two or more access links. For example, communication network 500 could establish a communication path from access link 602 to access link 607 through links 710-713 and switch nodes 512, 517, 522, 527, and 532.

Network Control System

Figure 6:
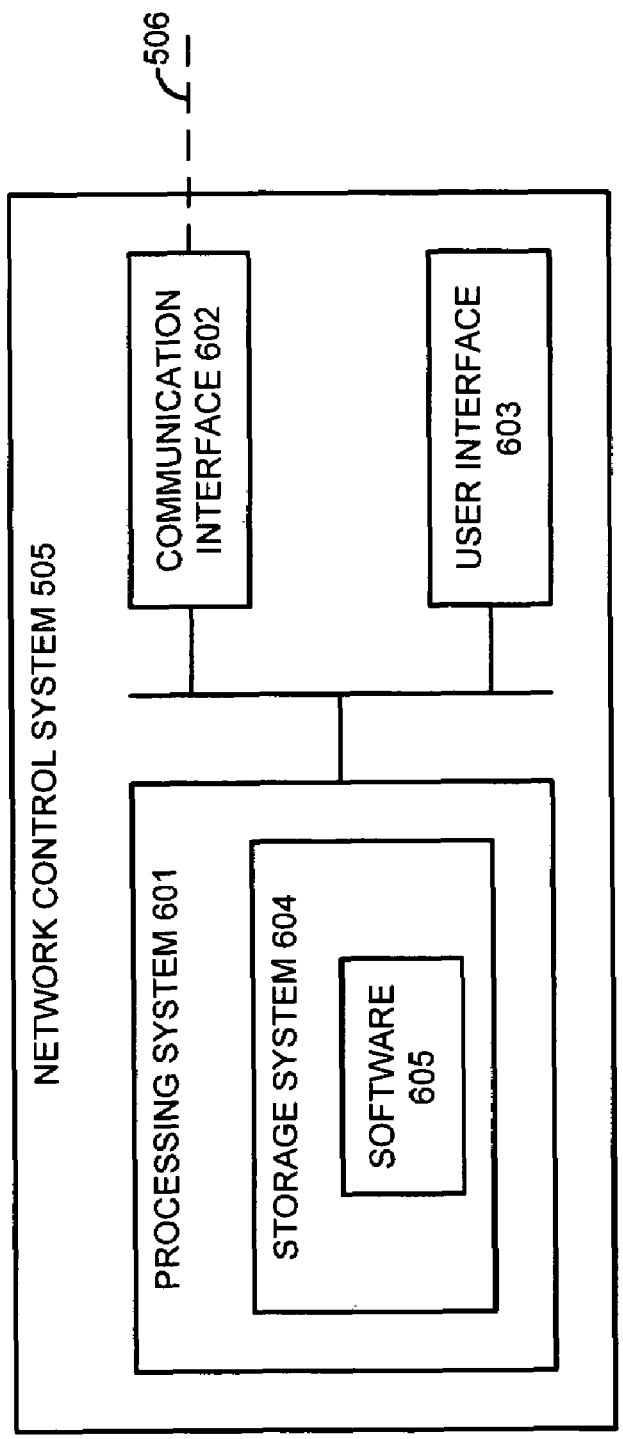
FIG. 6 illustrates a network control system in an example of the invention.

FIG. 6 illustrates network control system 505 in an example of the invention. Network control system 505 includes processing system 601, communication interface 602, and user interface 603. Processing system 601 includes storage system 604. Storage system 604 stores software 605. Processing system 601 is linked to communication interface 602 and user interface 603. Network control system 505 could be comprised of programmed general-purpose computing equipment, although those skilled in the art will appreciate that programmable or special purpose circuitry and equipment may be used. Network control system 505 may use a client server architecture where operations are distributed among a server system and client devices that together comprise elements 601-605.

Communication interface 602 could comprise a network interface card, port, or some other communication device. Communication interface 602 may be distributed among multiple communication devices. Communication interface 602 exchanges controls signals 506 with switch nodes 511-535.

User interface 603 could comprise a keyboard, mouse, voice recognition interface, microphone and speakers, graphical display, touch screen, or some other type of user device.

Processing system 601 could comprise a computer microprocessor, logic circuit, or some other processing device. Processing system 601 may be distributed among multiple processing devices. Storage system 604 could comprise a disk, tape, integrated circuit, server, or some other memory device. Storage system 604 may be distributed among multiple memory devices.

Processing system 601 retrieves and executes software 605 from storage system 604. Software 605 may comprise an operating system, utilities, drivers, networking software, and other software typically loaded onto a general-purpose computer. Software 605 could comprise an application program, firmware, or some other form of machine-readable processing instructions. When executed by processing system 601, software 605 directs processing system 601 to operate as described herein.

Figure 7:
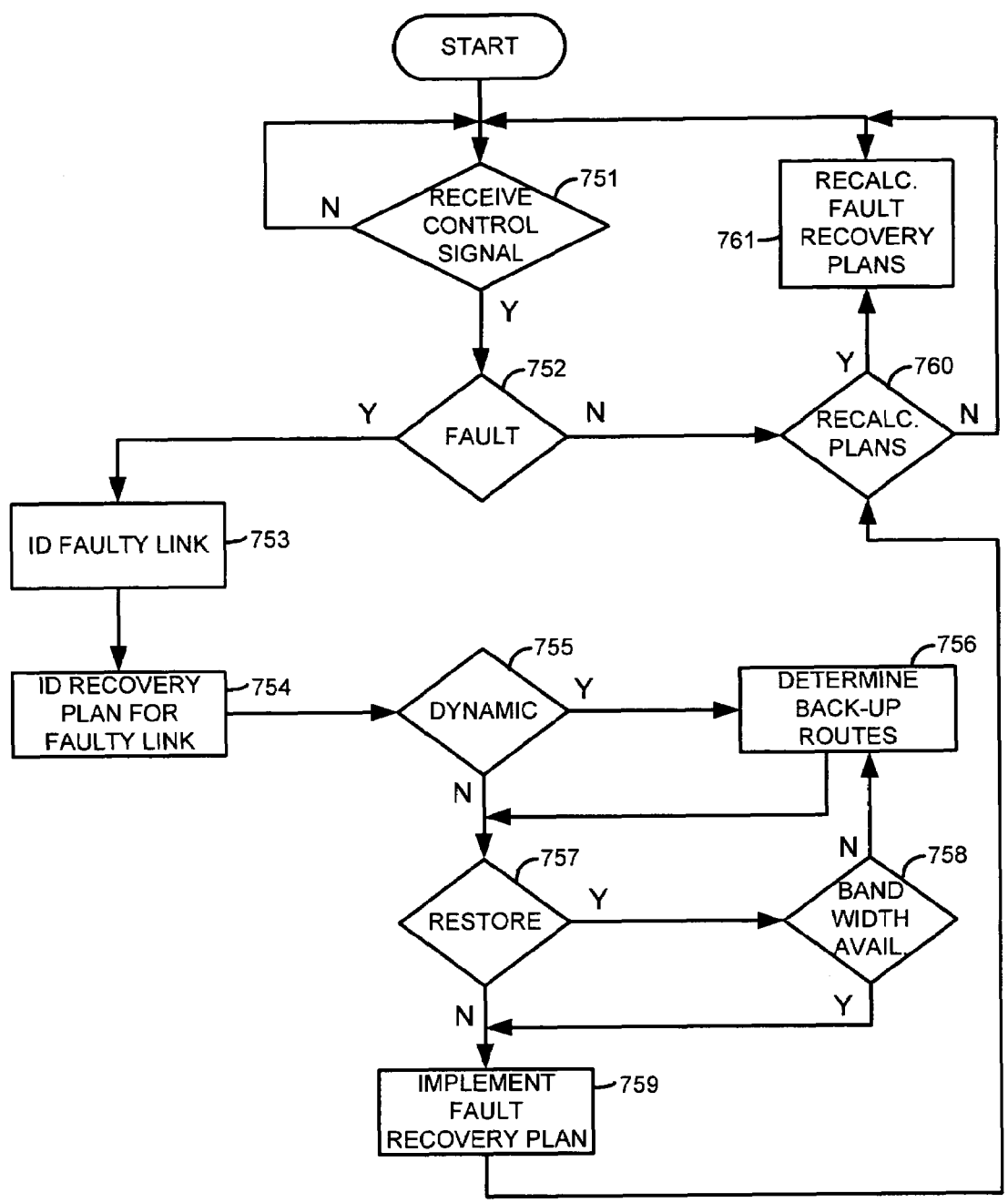
FIG. 7 illustrates a network control system operation in an example of the invention.

FIG. 7 illustrates network control system operation in an example of the invention. Reference numerals from FIG. 7 are indicated parenthetically below. The network control system starts by awaiting control signals (751). If a control signal that indicates a fault is received (752), then the network control system identifies the faulty link (753). The network control system then identifies the fault recovery plan for the failed link (754).

The network control system determines if the identified fault recovery plan is dynamic (755). If the fault recovery plan is dynamic (755), then the network control system selects the back-up routes (756). If the fault recovery plan is pre-determined (755), or after the back-up routes are selected (756), then the network control system determines if the fault recovery plan uses restoration (757). If the fault recovery plan uses restoration (757), then the network control system checks the selected back-up routes to determine if the required bandwidth is available (758). If the fault recovery plan is protection (757), or if the bandwidth is available (758), then the network control system transfers control signals to implement the identified fault recovery plan (759). If the restoration bandwidth is not available (758), then the network control system determines other back-up routes (756).

After the fault recovery plan is implemented (759) or if the control signals do not indicate a fault (752) or if the fault recovery timer expires, then the network control system processes the control signals to determine if the fault recovery plans need to be recalculated (760). For example, if the control signals indicate a network topology change due to a link or node being unavailable, then the network control system would typically recalculate the fault recovery plans. After the network control system implements a fault recovery plan, the network control system would typically recalculate the fault recovery plans to account for the new network topology. If the fault recovery plans need to be recalculated (760), then the network control system recalculates the fault recovery plans (761). If the fault recovery plans do not need to be recalculated (760), or after the fault recovery plans are recalculated (761), then the network control system awaits a control signal (751).

Fault Recovery Plan Calculations

Figure 8:
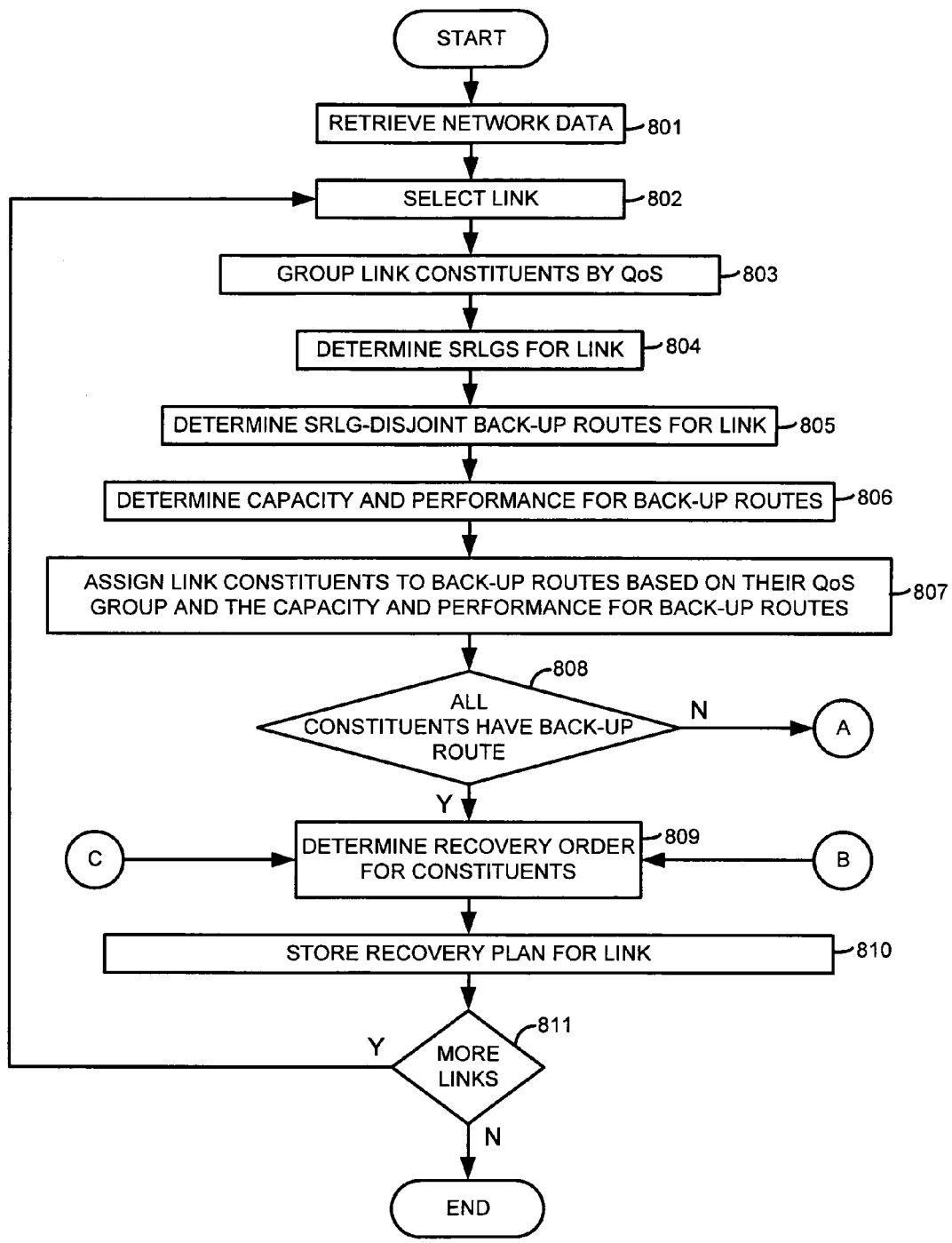
FIG. 8 illustrates a fault recovery plan calculations in an example of the invention.

FIG. 8 illustrates fault recovery plan calculations for the network control system in an example of the invention. Reference numerals from FIG. 8 are indicated parenthetically below. The network control system retrieves current network data (801). The network control system then selects a link (802). The network control system groups each link constituent in the selected link based on their individual QoS requirements (803). There may be a few or several such constituent groups based on the desired resolution of QoS characteristics. A simple scheme may use only three constituent groups based on three general levels of fault recovery time, bit error rate, and bandwidth. A more complex scheme may use 20 constituent groups to account for various levels of availability, jitter, latency, recovery time, bit error rate, bandwidth, and the like. Thus, each link constituent is placed into a constituent group that will support the specific QoS requirements of that link constituent.

The network control system then determines Shared Risk Link Groups (SRLGs) for the link (804). SRLGs are a group of links that fail together because they share cabling, fiber, equipment, or some other risk component. The network control system then determines all back-up routes that are not in an SRLG with the link (805). In other words, the network control system selects back-up routes that are SRLG-disjointed with the selected link.

The network control system then assesses the capacity and performance characteristics of the SRLG-disjointed back-up routes (806). Such characteristics may include availability, jitter, latency, recovery time, bit error rate, bandwidth, and the like. The network control system then assigns link constituents in the same constituent group to SRLG-disjointed back-up routes that have the requisite capacity and performance characteristics to support the QoS requirements of the constituent group (807). Link constituents in the same constituent group may be assigned to the same back-up route, however, link constituents in the same constituent group may be distributed among multiple back-up routes that each support the QoS requirements of the constituent group.

The network control system then determines if all of the link constituents have suitable back-up routes (808). If all of the link constituents have suitable back-up routes (808), then the network control system prioritizes link constituents by recovery order (809). The recovery order controls the time sequence in which fault recovery is initiated for the link constituents. Batch signaling may be used to initiate fault recovery for all link constituents at the same level in the recovery order. Typically, link constituents in the same constituent group would be placed at the same level in the recovery order, however, constituents in the same constituent group may be placed at different levels if needed. The link constituents that are placed in the earlier position in the recovery order could be restored before the other link constituents in the link locate their back-up routes.

For example, a critical link constituent in a high-priority constituent group may require exceptionally fast fault recovery, so the critical link constituent may be given the first position in the recovery order. The remaining link constituents in the high-priority constituent group may be given the second position in the recovery order, and the other constituent groups could be given the third position in the recovery order. Based on the recovery order, the network control system will initiate fault recovery for the critical link constituent first, then for the high-priority constituent group, and finally for the remaining constituent groups. The recovery order may have multiple levels, so the network control system can use batch signaling at each level of the recovery order to initiate the recovery of multiple link constituents or constituent groups in a complex prioritized order to provide faster recovery for the higher priority traffic.

After the link recovery order is set (809), the network control system stores the fault recovery plan for the link (810). The network control system then determines if more links require fault recovery plan calculations (811), and if so, the network control system selects another link (802). If no more links require calculations, then the process ends.

Figure 9:
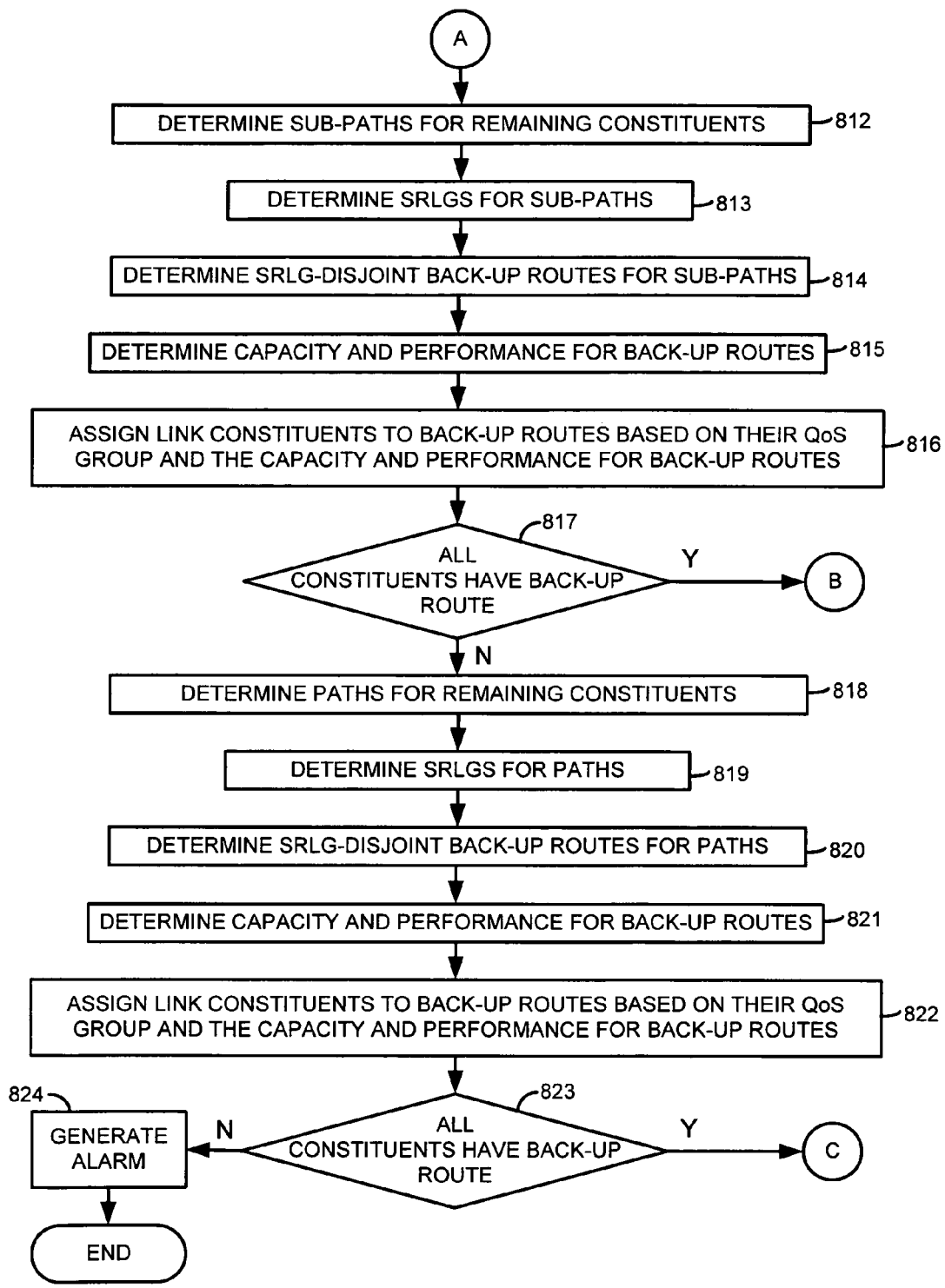
FIG. 9 illustrates a fault recovery plan calculations in an example of the invention.

If any of the link constituents do not have suitable back-up routes after link-based recovery is calculated (808), then the network control system identifies sub-paths for the remaining constituents (812—FIG. 9). The network control system determines the SRLGs for the sub-paths (813). The network control system then determines the back-up routes that are SRLG-disjointed with the selected sub-paths (814).

The network control system assesses the available capacity and performance characteristics of the SRLG-disjointed back-up routes (815). Such characteristics may include, latency, fault recovery time, jitter, packet loss, or the like. The network control system then assigns link constituents in the same constituent group with SRLG-disjointed back-up routes that have the requisite capacity and performance characteristics to support the QoS requirements of the constituent group (816). Link constituents in the same constituent group may also be distributed among multiple back-up routes that each support the QoS requirements of the constituent group.

The network control system then determines if all of the link constituents have suitable back-up routes after sub-path-based recovery is calculated (817). If all of the link constituents have suitable sub-path back-up routes (817), then the network control system prioritizes the link constituents or constituent groups by recovery order (809—FIG. 8). If all of the link constituents still do not have suitable back-up routes (817), then the network control system identifies paths for the remaining link constituents (818). The network control system determines the SRLGs for the paths (819). The network control system determines the back-up routes that are SRLG-disjointed with the selected paths (820).

The network control system then assesses the available capacity and performance characteristics of the SRLG-disjointed back-up routes (821) after path-based recovery is calculated (817). Such characteristics may include, latency, fault recovery time, jitter, packet loss, or the like. The network control system then assigns link constituents in the same constituent group with SRLG-disjointed back-up routes that have the requisite capacity and performance characteristics to support the QoS requirements of the constituent group (822). Link constituents in the same constituent group may also be distributed among multiple back-up routes that each support the QoS requirements of the constituent group.

The network control system then determines if all of the link constituents have suitable back-up routes (823). If all of the link constituents have suitable back-up routes (823), then the network control system prioritizes each of the link constituents or constituent groups by recovery order (809—FIG. 8). If all of the link constituents do not have suitable back-up routes (823), then the network control system generates an alarm (824) and the process ends.

From the above discussion, it should be appreciated the network control system calculates and implements a fault recovery plan for each link in the communication network. The fault recovery plans may use pre-determined back-up routes or dynamically selected back-up routes. If dynamic selection is used, then the network control system could use the same general logic that is employed to select pre-determined back-up routes. The network control system would typically select pre-determined back-up routes for a link, unless the network operator indicates that the back-up routes for the link should be dynamically selected. The fault recovery plans may use protection or restoration. The network control system would typically use protection for a link, unless the network operator indicates that the fault recovery plan for the link should use restoration.

Advantages

The fault recovery plans include back-up routes for links, sub-paths, and paths. Thus, the network control system can implement a hybrid mix of path, sub-path, and link fault recovery schemes. Advantageously, the fault recovery plans assign link constituents to back-up routes that support the QoS requirements of the link constituent. In addition, the network control system adaptively updates the fault recovery plans in response to changing network conditions.

The invention claimed is:

1. A method of operating a control system to calculate a fault recovery plan for a link in a communication network, the method comprising:

grouping link constituents for the link into constituent groups based on Quality-of-Service (QoS) requirements for each of the link constituents, determining link back-up routes that are disjoint from the link, determining performance characteristics for the link back-up routes, and assigning at least a first portion of the constituent groups to at least a portion of the link back-up routes based on the QoS requirements of the first portion of the constituent groups and the performance characteristics of the link back-up routes;

if any of the constituent groups are unassigned to the link back-up routes, then determining sub-paths for the link, determining sub-path back-up routes that are disjointed from the sub-paths, determining performance characteristics for the sub-path back-up routes, and assigning at least a second portion of the constituent groups to at least a portion of the sub-path back-up routes based on the QoS requirements of the second portion of the constituent groups and the performance characteristics for the sub-path back-up routes; and if any of the constituent groups are unassigned to either the link back-up routes or the sub-path back-up routes, then determining paths for the link, determining path back-up routes that are disjointed from the paths, determining performance characteristics for the path back-up routes, and assigning at least a third portion of the constituent groups to at least a portion of the path back-up routes based on the QoS requirements of the third portion of the constituent groups and the performance characteristics for the path back-up routes.

2. The method of claim 1 wherein the performance characteristics include available bandwidth and latency.

3. The method of claim 1 wherein the QoS requirements include fault recovery time, bandwidth, and latency.

4. A control system to calculate a fault recovery plan for a link in a communication network, the control system comprising:

a processing system configured to group link constituents for the link into constituent groups based on Quality-of-Service (QoS) requirements for each of the link constituents, determine link back-up routes that are disjoint from the link, determine performance characteristics for the link back-up routes, ad assign at least a first portion of the constituent groups to at least a portion of the link back-up routes based on the QoS requirements of the first portion of the constituent groups and the performance characteristics of the link back-up routes;

the processing system further configured, if any of the constituent groups are unassigned to the link back-up routes, to determine sub-paths for the link, determine sub-path back-up routes that are disjointed from the sub-paths, determine performance characteristics for the sub-path back-up routes, and assign at least a second portion of the constituent groups to at least a portion of the sub-path back-up routes based on the QoS requirements of the second portion of the constituent groups and the performance characteristics for the sub-path back-up routes;

the processing system further configured, if any of the constituent groups are unassigned to either the link back-up routes of the sub-path back-up routes, to determine paths for the link, determine path back-up routes that are disjointed from the paths, determine performance characteristics for the path back-up routes, and assign at least a third portion of the constituent groups to at least a portion of the path back-up routes based on the QoS requirements of the third portion of the constituent groups and the performance characteristics for the path back-up routes; and a communication interface operationally coupled to the processing system and configured to exchange control signals with the communication network.

5. The control system of claim 4 wherein the performance characteristics include available bandwidth and latency.

6. The control system of claim 4 wherein the QoS requirements include fault recovery time, bandwidth, and latency.

7. A computer readable medium having instructions stored thereon for operating a control system to calculate a fault recovery plan for a link in a communication network, wherein the instructions, when executed by the control system, direct the control system to:

group link constituents for the link into constituent groups based on Quality-of-Service (QoS) requirements for each of the link constituents, determine link back-up routes that are disjoint from the link, determine performance characteristics for the link back-up routes, and assign at least a first portion of the constituent groups to at least a portion of the link back-up routes based on the QoS requirements of the first portion of the constituent groups and the performance characteristics of the link back-up routes;

if any of the constituent groups are unassigned to the link back-up routes, to determine sub-paths for the link, determine sub-path back-up routes that are disjointed from the sub-paths, determine performance characteristics for the sub-paths back-up routes, and assign at least a second portion of the constituent groups to at least a portion of the sub-path back-up routes based on the QoS requirements of the second portion of the constituent groups and the performance characteristics for the sub-path back-up routes; and if any of the constituent groups are unassigned to either the link back-up routes or the sub-path back-up routes, to determine paths for the link, determine path back-up routes that are disjointed from the paths, determine performance characteristics for the path back-up routes, and assign at least a third portion of the constituent groups to at least a portion of the path back-up routes based on the QoS requirements of the third portion of the constituent groups and the performance characteristics for the path back-up routes.

8. The computer readable medium of claim 7 wherein the performance characteristics include available bandwidth and latency.

9. The computer readable medium of claim 7 wherein the QoS requirements include fault recovery time, bandwidth, and latency.

* * * * *